United States Patent Office 3,005,943
Patented Oct. 24, 1961

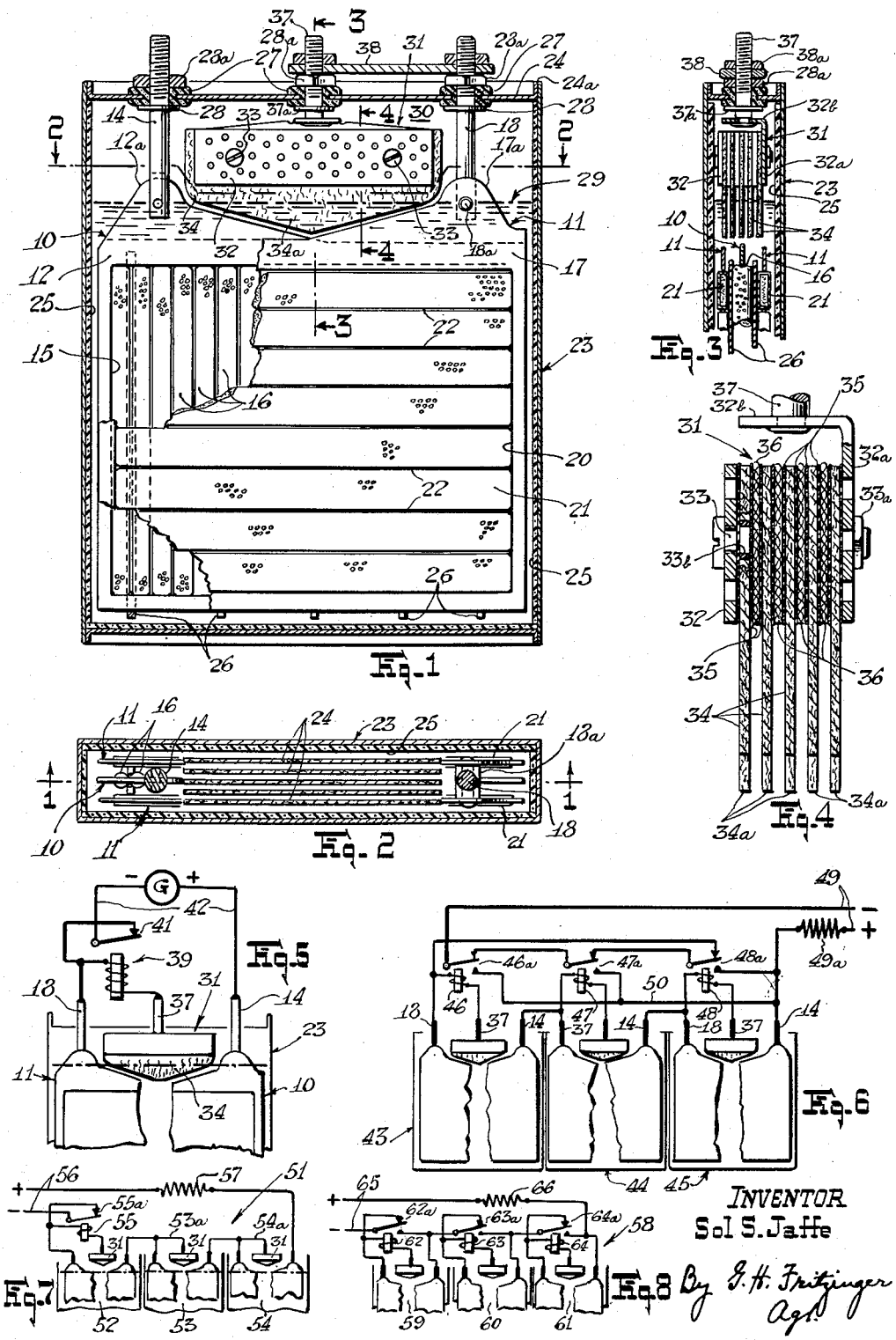

3,005,943
SEALED STORAGE CELL USING LIQUID ELECTROLYTE
Sol S. Jaffe, West Orange, N.J., assignor, by mesne assignments, to The Electric Storage Battery Company, Philadelphia, Pa., a corporation of New Jersey
Filed Apr. 10, 1957, Ser. No. 651,856
11 Claims. (Cl. 320—13)

This invention relates to sealed storage cells of the wet type using a liquid electrolyte. The invention has been embodied in terms of a nickel-cadmium-alkaline cell and is herein described in connection with such cell but without intending any unnecessary limitation thereto.

An object of my invention is to provide a stable and dependable form of sealed storage cell which has a long life.

In making sealed storage cells measures are taken to avoid any appreciable evolution of hydrogen gas but evolution of oxygen gas is permitted since oxygen gas is readily recombinable with the active material of the negative electrode. Sealed storage cells of the semidry type permit ready contact of the evolved oxygen gas with the negative active material and are now quite well known. (See, for example, Neumann et al. Patent 2,571,927.) In a semidry cell a liquid electrolyte is contained only by absorption in permeable separators between the electrodes. Since the electrolyte so contained is of a limited quantity, semidry cells cannot tolerate any appreciable loss in water. For instance, if a minute leak develops in the container to allow escape of any gas or vapor, or if water from the electrolyte should condense onto the internal walls of the cell, the electrode pack may become excessively dry to reduce the capacity of the cell. It is difficult therefore to assure good life from sealed semidry storage cells.

The present invention provides a means of producing a sealed storage cell in which the electrodes are immersed in liquid electrolyte. By so immersing the electrodes, a life is obtained characteristic of that of conventional open cells of the wet type. Moreover, more efficient use of electrodes is permitted because electrodes in general work better in wet cells than in cells of the semidry type.

In the present sealed wet cell, evolution of hydrogen is avoided by the procedure described and claimed in the Grieger application Serial No. 563,753, filed February 6, 1956 and having common ownership with the present application, as is hereinafter more fully explained. On the other hand, oxygen evolved from the positive electrode is consumed through the agency of an oxygen electrode electrically connected to the negative electrode and partly immersed in the electrolyte. The oxygen electrode is fed by oxygen from the gas space in the sealed container and produces a current flow between it and the negative electrode causing the oxygen to be reduced and the negative electrode to be oxidized—i.e., discharged—with the same ultimate effect as if the oxygen were enabled to contact directly the active material of the negative electrode.

As charging of a cell proceeds, the charging efficiency of the positive electrode is gradually reduced to cause more and more of the current to become effective in evolving oxygen gas instead of converting nickel oxide to a higher state of oxidation. If the charging is continued, ultimately oxygen is evolved at a rate equal to the electrical equivalent of the charging current. As oxygen pressure in the cell container increases, oxygen is consumed at a faster rate by the oxygen electrode and the current increases correspondingly in the auxiliary circuit between the oxygen and negative electrodes. If a stabilized condition is reached before the negative electrode is fully charged where the oxygen is consumed as fast as it is evolved, the discharging effect of the current in the auxiliary circuit on the negative electrode counterbalances the charging effect of the charge current through the cell to cause the charge state of the negative electrode to remain fixed regardless of how long the charging operation is continued.

An object of my invention is to provide an improved form of oxygen electrode characterized as having a long life.

Another object is to terminate the charging of a cell of the present character by a relay connected in the auxiliary circuit between the oxygen and negative electrodes, which relay operates whenever the oxygen pressure in the cell reaches a predetermined value to open the charging circuit.

A further object is to provide a novel on-off control means for cells of the present character which are operative to regulate automatically the charge to a desired average current.

A further object is to provide a control apparatus responsive to a property of a sealed cell when the cell reaches a charged condition for terminating the charge without the need for movable control elements within the cell.

Further objects are to provide improved charging circuits for cells of the present character which are operable to terminate the charging operation whenever one or more of the individual cells reach a predetermined state of charge.

Oxygen electrodes employing porous carbon or metallic catalytic agents are well known. Carbon electrodes provide a large interface between the oxygen gas and the electrolyte and have a good efficiency, but are not practical for the present purposes because they have a short life due to gradual soaking up of electrolyte. Oxygen electrodes using a suitable metal as a catalyst have a long life but have not been heretofore satisfactory because of their limited current output. By my invention, I provide an improved oxygen electrode wherein an unusually large contact area is obtained between the oxygen and the electrolyte into contact with one face of each perelectrode a markedly improved efficiency. This oxygen electrode is characterized by the use of thin, perforated sheets of metallic catalytic agents such as palladium with interposed wicks and open-mesh spacers for drawing the electrolyte into contact with one face of each perforated palladium sheet while leaving the opposite face thereof exposed to the oxygen gas.

Further objects of my invention are theretofore to provide improved oxygen electrodes having improved space efficiency, to provide such electrodes which are not disabled by having been immersed in or drenched by a liquid electrolyte, and in providing such electrodes which make efficient and economical use of expensive catalytic metals.

These and other objects and features of my invention will be apparent from the following description and the appended claims.

In the description of my invention reference is had to the accompanying drawings, of which:

FIGURE 1 is a side elevational view of the electrode assembly of a cell according to my invention showing portions broken away and showing the container in section on a medial line 1—1 of FIGURE 2;

FIGURE 2 is a horizontal section taken on the line 2—2 of FIGURE 1;

FIGURES 3 and 4 are respective vertical sections taken on the lines 3—3 and 4—4 respectively of FIGURE 1;

FIGURE 5 is a circuit diagram showing a charging circuit for a single cell of my invention; and FIGURES 6, 7 and 8 are circuit diagrams showing different circuits for charging sealed storage cells in series according to my invention.

By way of example, the positive electrodes may comprise an active material of nickel oxide with conducting material such as nickel flake, and the negative electrodes may comprise an active material principally of cadmium oxide to which is added, for example, a small proportion of latex as an expander. The electrolyte is preferably a 20% by weight solution of potassium hydroxide in water with some addition of lithium hydroxide.

Each electrode may be constituted by one or more plates made of metal such as nickel-plated steel provided in a suitable form for carrying the active material. The plates of the positive electrodes may, for example, be of the usual tubular type and those of the negative electrodes of the usual pocket type. Each cell may comprise, for example, one positive plate 10 interposed between two negative plates 11 as shown in FIGURE 2. The positive plate 10 comprises a metal frame 12 provided with an upstanding lug 12a to which is connected a terminal post 14. The frame is of a sheet form having the main central portion cut away to provide it with a large rectangular opening 15. Mounted on the plate in this opening is a row of vertical tubes 16 each made of perforated metal and filled with the positive active material aforementioned. The ends of the tubes are clamped closed and suitably secured to the frame 12 along the upper and lower edges of the opening 15. Each negative plate comprises a frame 17 provided with an upstanding lug 17a. As shown in FIGURE 2, the negative electrode comprises two such plates having the two lugs thereof bridged by a connector 18a to which is connected a single terminal post 18. The frame 17 of each plate is of a sheet form having its main central portion cut away to provide it with a large central opening 20 corresponding to the opening 15 of the positive plate. Mounted on the frame 17 in this opening are two spaced perforated sheets 21 between which is located the negative active material aforementioned. The sheets 21 are closed along their edges and are crimped at vertical intervals 22 to form crosswise pockets for confining the active material, and the edges of the sheets 21 are suitably secured to the frame 17. Such negative plates are referred to as being of the cadmium strip pocket type.

The single positive plate and the two oppositely-disposed negative plates of each cell are suspended in a container 23 from the cover 24 thereof via their terminal posts 14 and 18. The cover is sealed at its rim 24a to the side walls of the container. Lining the inside of the container is an insulative sheet 25 and interposed between the plates are insulating strips 26 such as of hard rubber or nylon. Each terminal post passes through a rubber grommet 27 in a respective hole in the cover 24. By means of a flange 28 on each post below the grommet and a nut 28a threaded tightly onto the upper portion of each terminal post, the grommet is clamped tightly to seal the post airtight to the cover. In the container there is a liquid electrolyte 29 fully covering the electrodes, and above the electrolyte there is a gas space 30. If desired, the container may be provided with any suitable valve (not shown) for release of excessive pressure should the cell ever be so unduly overcharged or overdischarged as might give rise to a dangerous internal pressure. Any provision of such valve only for release of inordinate pressure which might arise through misuse of the cell is not herein deemed as preventing the cell from being properly termed as "sealed."

Typically, the positive electrode may comprise twenty tubes each 3/16" in diameter and 4¼" long in a parallel planar arrangement to form a plate. When the pocketed active material of each negative plate is approximately .080" thick and extends throughout an area equal approximately to that of the active surface of the positive plate, the compined capacity of the two negative plates equals approximately that of the positive plate. It may be noted that the term "charge capacity" of an electrode is herein employed to mean the amount in terms of ampere hours of effectively active material in the electrode, taking into account the efficiency factor arising from the manner in which the material is used. In other words, the ampere hours which an electrode will accept in going from a prescribed discharged to a fully-charged state in an inert atmosphere is its charge capacity. The term "charge content" is used herein to represent the ampere hours which the electrode has accepted in going from a prescribed discharged state to the condition of charge which the electrode actually has.

A nickel oxide positive electrode will evolve oxygen gas to some extent throughout the charging thereof but a cadmium oxide negative electrode will first evolve an inconsequential amount of hydrogen and will thereupon in a sealed cell evolve substantially no further hydrogen either on open-circuit or during charging so long as the electrode is not charged above its rated hydrogen-free capacity. If these electrodes should be overdischarged—i.e., discharged both to points where the negative electrode is substantially fully oxidized and the positive electrode is substantially fully reduced—the negative electrode will evolve oxygen and the positive electrode will evolve hydrogen.

Since a sealed storage cell is a closed system wherein any given charge in ampere hours through the positive electrode is equal to the change in charge content plus the equivalent ampere hours of evolved oxygen which the charging current produces, it does not matter as between specified discharged and overcharged conditions whether the oxygen gas is considered as having been evolved gradually throughout the charging period or as having been evolved only while the electrode is being overcharged, the term "overcharged" being herein used to mean that charging current is passed through the positive electrode after it is in a nearly fully oxidized condition. As an approximation and for simplification of description, a normal charge operation may be considered as one wherein the charging current is effective to change the charge content of the electrode without producing any substantial evolution of gas, and an overcharge operation is one wherein the current is effective to evolve gas in proportion to the charging current without producing any substantial change in charge content.

In order to assure that the positive electrode will be the only one to evolve gas when the storage cell is charged, the positive electrode is provided with an initial charge content greater than that of the negative electrode by a suitable margin, and the relative capacities of the electrodes are so adjusted that the remaining chargeable capacity of the positive electrode is less than that of the negative electrode as in accordance with the invention described and claimed in the pending Grieger application aforementioned. If the charge capacities of the positive and negative electrodes are nearly equal, the negative electrode will not be yet fully charged by that margin when the positive electrode reaches a state of full charge. To the extent that evolved oxygen is permitted to accumulate in the container during the charging operation, that safety margin against overcharge of the negative is reduced. But if the evolved oxygen is recombined with the active material of the negative electrode as fast as it is evolved, the charge state of the negative electrode becomes constant no matter how long the cell is overcharged. On the contrary when the cell is discharged, it will be the negative electrode which will be the first to be fully discharged because of the initial higher charge content of the positive electrode. If the cell is overdischarged, the negative electrode will then evolve oxygen. Unless and until an overdischarge is carried to the point where the oxygen evolved from the negative electrode has the charge equivalent of the initial excess-charge content of the positive electrode over that of the negative electrode, the positive electrode will not be overdischarged to evolve hydrogen. In a wet cell uing cadmium oxide for the negative active material, extensive overdischarging of the negative electrode does not impair its properties in any way.

The oxygen electrode employed in the present wet cell to absorb the evolved oxygen and cause its recombination with the negative electrode may be any air-depolarizing electrode such as of activated carbon which has been suitably waterproofed to deter absorption of electrolyte. However, carbon electrodes have not only a poor life but the carbon surface exposed to the evolved oxygen should also be kept dry to keep the carbon in an operative condition. The use of a carbon electrode would therefore impose the requirement that the cell be always kept in an upright position which would of course limit greatly its practical use. By my invention I provide a vastly improved oxygen electrode 31 which is not subject to these limitations. This electrode uses thin sheets of a porous or finely-perforated metal catalyst which are located in the gas space, together with a series of felt wicks contacting one face of each metal sheet for leading the electrolyte into contact therewith while leaving the other face of the perforated sheet exposed to the oxygen gas. For example, the oxygen electrode is in the form of a stack having apertured rectangular nickel end plates 32 and 32a and a plurality of intermediate wicks 34 and thin finely-perforated palladium foils 35 located at opposite sides of each wick, and a woven screen spacer 36 interposed between each foil-wick-foil group. The foils and spacers are confined in the space between the end plates but the wicks are provided with depending V-shaped portions 34a as shown in FIGURE 1. Two bolts 33 traverse the stack and have nuts 33a threaded on the end portions thereof to hold the parts in assembled relation. In order to prevent clamping pressure being exerted on the wicks, the holes therein through which pass the bolts are lined with metal sleeves 33b, one of which appears in FIGURE 4, which also serve to make electrical connection between the metal foils and the bolts. It is to be understood that the metal catalyst may be any metal having the ability to catalyze the electrochemical reduction of oxygen. Such metals include particularly palladium and platinum and other metals similar thereto. However, palladium is preferably used because of its lower cost. The spacers 36 are woven screens of any metal or plastic which is inert in alkaline electrolyte, screens as of nickel or nickel-plated steel being preferred. The wicks 34 are preferably in the form of a mat or felt of fibrous material also inert in alkaline electrolyte, such as of Dynel or nylon. As illustrative dimensions, there may be five wicks each 2.9" wide and .022" thick, ten perforated palladium foils each .625" x 2.8" in area and .0001" thick, and four spacers each .625" x 2.8" in area of 8 by 8 mesh and .028" thick.

The oxygen electrode 31 is supported midway between the terminal posts 14 and 18 with depending wick portions 34a dipping into the electrolyte and conforming generally to the outline of the upper portion of the negative and positive electrode pack. The supporting means for the oxygen electrode comprises a terminal post 37 anchored to a lug 32b turned over from the nickel end plate 32a. This post extends upwardly through a grommet 27 in a hole in the cover 24 and is secured airtight thereto by a nut 28a on the post clamping the grommet against a flange 37a on the post. The post is permanently electrically connected to the negative post 18 during use of the cell as by a strap 38 shown in FIGURE 1.

In the operation of the oxygen electrode the wicks 34 draw the electrolyte up into contact with one side face of each of the perforated foils 35. The coarse screen spacers 36 have sufficiently large interstices to prevent entrapment of liquid electrolyte and enable therefore free contact of oxygen gas with the other side faces of the perforated foils. There is thus obtained a large area of contact between the liquid electrolyte, palladium foils and oxygen gas to enable the palladium foils to act as efficient catalysts. If the cell is laid on its side or upset and then again righted, or if electrolyte is splashed up onto the stack portion of the oxygen electrode, the electrolyte will drain quickly from the screen spacers 36 to permit again ready contact of oxygen from the space 30 with the sides of the foils opposite the wicks.

When oxygen is evolved into the gas space 30, a current flows between the terminals 37 and 18 of the oxygen and negative electrodes. This current is due to the oxygen contacting the electrolyte in the presence of the palladium catalyst and being there reduced, creating a potential which drives the aforementioned current in such a direction as to oxidize the cadmium electrode in proportion to the electrochemical equivalent of the oxygen consumed from the gas space 30. As oxygen pressure increases, so does the current in the auxiliary circuit, the value of the current for any given pressure depending on the oxygen-reducing efficiency of the oxygen electrode.

In order that the cell may not be so overcharged as to build up an excessive internal pressure due to the oxygen being evolved at a faster rate than it is consumed by the oxygen electrode over any extended period, I provide by my invention a means for automatically terminating and/or regulating the charge. This means comprises a relay 39 having a coil connected in the circuit between the negative and oxygen electrodes, it being understood that the strap 38 aforementioned and shown in FIGURE 1 is removed when a cell is connected to a charging circuit as shown in FIGURE 5. The relay has a pair of normally-closed contacts 41 connected in the charge circuit 42 which connects a charging generator G to the positive and negative terminals. As the charging progresses to where the positive electrode begins to evolve oxygen, a current begins to flow through the coil of the relay. By choice of the relay characteristics, the relay can be made to operate to break the charging circuit whenever the oxygen pressure in the cell reaches a preselected value. By way of typical example, the volume of the gas space 30 above the electrolyte for the cell hereinabove specifically described may be approximately 80 cc. and this space may be filled with an inert gas such as nitrogen at atmospheric pressure when the cell is sealed. Upon charging this cell from a discharge condition for nearly 7 hours and 40 minutes at 1.5 amperes, there remains about 40 cc. of oxygen in the gas space 30 giving rise to an internal pressure of about one-half atmosphere, the oxygen which so remains being that which has not had time to be consumed by the oxygen electrode. When the internal pressure reaches this value, the current between the oxygen and negative electrodes through the relay will be about 85 ma. at which point the relay may be set to operate. It has been found that of the total 11.5 ampere hours charge fed into the cell (1.5 amperes×7⅔ hours) approximately 11.1 amepre hours is converted into charge content and .4 ampere hour is spent in evolving oxygen. Of this evolved oxygen, an amount equivalent to approximately .22 ampere hour reacts via the oxygen electrode with the negative electrode, leaving about .18 ampere hour of oxygen in the gas space at the end of the charge period.

When the charge has been terminated by the relay, a current will continue to flow in the auxiliary circuit between the oxygen and negative electrodes so long as oxygen remains in the cell container. When the current falls to a preset minimum depending again on the relay characteristics, the relay drops out to reconnect the charging circuit. The charging operation then commences again and continues until the oxygen pressure again builds up to a point where it causes the relay to operate. Since the charging efficiency of the positive electrode will not be as high now as it was during the first charging period, the oxygen pressure will build up more quickly to the point where the relay is again operated to terminate the charging operation. If the cell is left on the charging circuit indefinitely, the charging circuit will be intermittently closed and opened, with the positive electrode reaching a full state of charge where it simply gases oxygen during the "on" periods and with the charge state of the negative electrode shifting between a maximum less than its hydrogen-free charge capacity and a minimum below the maximum by the amount of the discharge effect of the current in the auxiliary circuit during each "off" period. By this on-off operation of the relay, the charging current is prevented from ever exceeding a safe average.

The relay 39 may be a permanent part of the cell or, alternatively, it may be a permanent part of the charging apparatus. In any case, an electrical connection is maintained between the auxiliary and negative electrodes either through the relay or through the strap 38 aforementioned. By reason of such connection, any oxygen remaining in the cell when it is taken from the charging rack, or which may develop while the cell is in use, is consumed by the oxygen electrode to keep the internal pressure at a minimum. This assures that the cell will be in condition to accept a charge when the cell is put back on the charging rack.

The quantity of oxygen gas which is in the gas space 30 at the time the cutoff relay operates has a corresponding charge equivalent in ampere hours. In accordance with the aforementioned Grieger invention, if the charge capacity of the positive electrode equals approximately the hydrogen-free charge capacity of the negative electrode, the positive electrode should have a charge content greater than that of the negative electrode which is at least as great as this charge equivalent when the cell is sealed, for in so doing it is assured that the negative electrode will not be overcharged to release hydrogen. If the capacity of the positive electrode is greater than that of the negative electrode, then the initial charge content of the positive should be greater than that of the negative when the cell is sealed by an amount equal to the difference in the charge capacities plus the charge equivalent of the accumulated oxygen required to cause the relay to operate. Even if the capacity of the positive electrode is less than that of the negative electrode, the positive electrode is still charged to a level suitably greater than that of the negative when the cell is sealed to assure against overdischarging the positive when the cell is discharged.

The overdischarge possibility occurs when several cells of a battery are used in series to operate a common load device. For instance, if one cell is weaker than the others of the battery to the point where its negative electrode fails while the other cells of the battery still have considerable charge content, the remaining cells will by their continuing discharge cause overdischarge of the negative electrode of that weaker cell and by that overdischarge will cause the negative electrode of the weaker cell to evolve oxygen. This oxygen simply accumulates in the cell because no current will flow between the oxygen electrode and the negative electrode when the negative electrode is in a fully-discharged condition. If this overdischarge were carried far enough, the positive electrode of the weaker cell would also begin to be overdischarged and would therefore evolve hydrogen. In order that this condition may not arise without having to increase the differential in the charge content of the positive electrode over that of the negative electrode when the cell is sealed, the cells of each battery are graded so that their charge capacities are within desired limits. With this limitation, the weakest cell cannot be overdischarged by the remaining cells of the battery to the point where the positive electrode of the weakest cell evolves hydrogen or where the build-up of pressure by oxygen evolved from the negative electrode exceeds the oxygen pressure which at the end of the charge causes operation of the cutoff relay. Such oxygen as does accumulate during overdischarge is used up by the oxygen electrode as soon as the cell is again charged because as charging current begins to flow through the cell a current will flow between the oxygen and negative electrodes to keep the negative discharged until the charge content of the positive is greater than that of the negative electrode by the differential which it had when cell was initially sealed.

In FIGURE 6 there is shown a charging circuit for a series of cells of my invention, which is particularly suitable when the cells are graded to have nearly equal capacities. The cells, which are designated 43, 44 and 45, are provided with respective cutoff relays 46, 47 and 48 having respective double-throw switches 46a, 47a and 48a making normally with their upper contacts. The charging circuit 49 is completed through a resistor 49a, the cells 43 to 45 in series and the switches 46a to 48a in series. Thus, as any one of the cells approaches a charged condition causing an oxygen accumulation in the cell container to a point whereat the current in the auxiliary circuit operates the respective relay, the charge circuit is broken for all of the cells. When the oxygen in that cell is used up by the oxygen electrode to the point where the relay drops out, the charging recommences, and so forth, as before explained. In this way the charging can continue only intermittently once overcharging of the positive of one of the cells has started. In order that a series of such batteries may be connected serially in a single charge circuit, there is provided a lead line 50 connecting one side of the charging circuit to each of the lower contacts of the switches 46a to 48a. Thus, operation of any one of the relays will maintain continuity of the charge circuit 49 even though each of the cells of the battery is disconnected from the charging circuit.

The alternative charging arrangement shown in FIGURE 7 is adapted for use with batteries where one of the cells is used for controlling the entire battery. The battery 51 may comprise three cells, 52, 53 and 54, of which the controlling cell 52 is preferably the weakest of the battery. Only this weakest cell is provided with a cutoff relay 55 in its auxiliary circuit, the other cells having direct connections 53a and 54a betwen their oxygen and negative electrodes. The charging circuit 56 is completed through a resistor 57, the three cells in series and contacts 55a of the relay 55. When the charge condition of the cell 52 reaches the point where the oxygen evolved is sufficient to cause operation of the cutoff relay, the contacts 55a are opened to terminate the charge of the entire battery.

In the alternative charging arrangement shown in FIGURE 8, a battery 58 of three cells, 59, 60 and 61, is provided in which the cells have respective cutoff relays 62, 63 and 64 connected in their auxiliary circuits. The charge circuit 65 is completed through a resistor 66, the cells in series and the switches 62a to 64a of the respective relays via their upper contacts. These switches have also lower contacts connected to the positive electrodes of the respective cells. When the oxygen pressure rises in any cell to a point causing operation of the respective relay, the switch of that relay is shifted from its upper to its lower contact to disconnect that cell from the charging circuit while leaving the charging circuit still connected through the remaining cells. When all of the cells have been charged to the points causing operation of the respective relays, all of the cells will be disconnected from the charging circuit and the charging circuit will be completed only through the resistor 66. This resistor may, of course, represent one or more additional batteries in the charging circuit.

The particular embodiments of my invention hereinabove shown and described are intended to be illustrative and not necessarily limitative of my invention since the same are subject to changes and modifications without departure from the scope of my invention, which I endeavor to express according to the following claims.

I claim:

1. A sealed storage cell capable of being repeatedly charged and discharged and having therein a liquid electrolyte and a gas space above the electrolyte, positive and negative electrodes immersed in said electrolyte, said positive electrode evolving oxygen when overcharged and said negative electrode having an auxiliary active material which is oxidizable when charged, an oxygen electrode having one portion in liquid contact with said electrolyte during both charge and discharge of the cell and another portion contacting said gas space, an auxiliary electrical circuit free of any potential source between said oxygen electrode and said negative electrode for permitting flow of current between said oxygen and negative electrodes responsive to electro-chemical reduction of oxygen gas from said gas space in the electrolyte at the oxygen electrode, a charging circuit for said cell connected between said positive and negative electrodes, and a relay having a coil connected in said auxiliary circuit and having switch contacts connected in said charging circuit, said switch contacts being normally closed and being opened to break said charging circuit as the relay is operated by current in said auxiliary circuit.

2. A sealed storage cell capable of being repeatedly charged and discharged and comprising a container having a liquid electrolyte therein and a gas space above said electrolyte, positive and negative electrodes immersed in said electrolyte, said positive electrode being oxidized as it is charged and evolving oxygen gas when overcharged and said negative electrode having an active material which is reduced on charging and which is readily oxidizable so long as the electrode is not fully discharged, said positive electrode having a higher state of charge than that of said negative electrode when the cell is sealed and the relative capacities of said electrodes being such that the remaining chargeable capacity of the positive electrode is less than the hydrogen-free charge capacity of the negative electrode, an auxiliary oxygen electrode partly in liquid contact with said electrolyte during both charge and discharge of the cell and partly exposed to said gas space, and circuit means free of any potential source connecting said oxygen electrode to said negative electrode to permit oxygen of said gas space to be electrochemically reduced at said oxygen electrode with resultant flow of current betwen said electrodes causing oxidation of the negative electrode according to said current.

3. The combination set forth in claim 2 including a charging circuit for said cell, and a relay coil connected in the circuit betwen said oxygen and negative electrodes and having a switch connected in said charging circuit for regulating the charge according to the oxygen pressure in said gas space.

4. In an electrolytic cell the combination of a liquid electrolyte, means providing a space for oxygen gas above the electrolyte, positive and negative electrodes in said cell each having a portion contacting said gas space and a portion contacting said electrolyte, an oxygen electrode in said cell comprising porous conductive catalytic material supported above said electrolyte with one face exposed to said gas space and a wick contacting the other face of said catalytic material and extending into said electrolyte, and an electrical connection exteriorly of said electrolyte between said negative electrode and said catalytic material to complete an electric circuit loop betwen said negative electrode and catalytic material via said electrolyte and said wick for flow of current in said loop responsive to reduction of oxygen from said gas space in said electrolyte.

5. A sealed storage cell comprising a container, a liquid alkaline electrolyte in said container and a gas space therein above said electrolyte, a positive electrode immersed in said electrolyte having an active material of nickel oxide tending to evolve oxygen into said gas space as the electrode is overcharged, a negative electrode immersed in said electrolyte and having an active material of cadmium oxide, said positive electrode having a charge content greater than that of said negative electrode when said cells are sealed, and the relative charge capacities of said electrodes being such that the remaining chargeable capacity of said positive electrode is less than the hydrogen-free charge capacity of said negative electrode, and an auxiliary oxygen electrode in said container electrically connected to said negative electrode, said oxygen electrode comprising a stack of spaced apertured metal foils with alternate wicks and open-mesh spacers between foils, said stack being located in said gas space and said wicks depending below the stack into said electrolyte, and said foils being of a metal acting as a catalyst to reduce oxygen from said gas space in said electrolyte and produce a current between said oxygen and negative electrodes having an oxidizing and discharging effect on the negative electrode proportional to the current flow between the electrodes.

6. The storage cells set forth in claim 5 wherein said electrodes have terminals extending through a wall of the container in sealed relation thereto, a relay having a coil connected in the circuit between said oxygen and negative electrodes and having a pair of normally closed contacts, a charging circuit for said cell serially including said normally closed contacts of said relay, said relay being adapted to operate to open said contacts in response to the current flow between said oxygen and negative electrodes when the oxygen pressure builds up in said container due to an overcharging of said positive electrode.

7. In combination: a battery of sealed storage cells each having a liquid electrolyte and a gas space therein, positive and negative electrodes immersed in said electrolyte of which the positive electrode comprises an active material which evolves oxygen into said space on overcharge and the negative electrode comprises an active material which when charged is oxidizable by the oxygen from said gas space, and an auxiliary oxygen electrode in said gas space contacting said electrolyte and electrically connected to said negative electrode; a relay for at least one of said cells having its coil connected in the circuit between the oxygen and negative electrodes thereof and having a pair of normally-closed switch contacts, said relay being adapted to operate to open said contacts by the current flow between said oxygen and negative electrodes when the oxygen pressure in said one cell reaches a predetermined value; and a charging circuit for said battery serially including said relay contacts.

8. The combination set forth in claim 7 wherein each of said cells includes a relay having a coil connected in the circuit between its oxygen and negative electrodes, each of said relays has a pair of normally-closed contacts and the said contacts are serially connected in said charging circuit whereby upon the oxygen pressure in any one of said cells reaching a value causing operation of the respective relay said charging circuit is disconnected from all of said cells.

9. The combination set forth in claim 8 wherein each of said relays has an additional contact made with one of the associated pair of contacts when the relay is operated, including a lead line connected to one side of said charging circuit and to each of said additional contacts for maintaining continuity of said charging circuit after operation of any one of said relays.

10. The combination set forth in claim 7 wherein only one of the cells of said battery has a relay connected in the circuit between its oxygen and negative electrodes, said one cell has less charge capacity than the other cells of said battery, and the pair of contacts of said relay are serially connected in said charging circuit.

11. The electrolytic cell set forth in claim 4 wherein said catalytic material comprises a stack of finely apertured foils of palladium metal, including wicks of fibrous material clamped between alternate ones of successive pairs of said foils and spacers of coarse woven material between the intervening alternate ones of successive pairs of said foils.

References Cited in the file of this patent

UNITED STATES PATENTS

| | | |
|---|---|---|
| 1,034,108 | Halbleib | July 30, 1912 |
| 2,070,612 | Niederreither | Feb. 16, 1937 |
| 2,104,973 | Dassler | Jan. 11, 1938 |
| 2,131,592 | Lange et al. | Sept. 27, 1938 |
| 2,309,054 | Fell | Jan. 19, 1943 |
| 2,571,927 | Neumann et al. | Oct. 16, 1951 |
| 2,578,027 | Tichenor | Dec. 11, 1951 |
| 2,646,455 | Jeannin | July 21, 1953 |
| 2,651,669 | Neumann | Sept. 8, 1953 |
| 2,708,212 | Koren et al. | May 10, 1955 |
| 2,842,607 | Germershausen et al. | July 8, 1958 |

FOREIGN PATENTS

| | | |
|---|---|---|
| 741,345 | Great Britain | Nov. 30, 1955 |